US006238465B1

(12) United States Patent
Juda et al.

(10) Patent No.: US 6,238,465 B1
(45) Date of Patent: May 29, 2001

(54) METHOD OF PRODUCING THIN PALLADIUM-COPPER AND THE LIKE, PALLADIUM ALLOY MEMBRANES BY SOLID-SOLID METALLIC INTERDIFFUSION, AND IMPROVED MEMBRANE

(75) Inventors: Walter Juda, Lexington; Charles W. Krueger, Cambridge; R. Todd Bombard, Pelham, all of MA (US)

(73) Assignee: Walter Juda Associates, Inc., Needham, MA (US)

( * ) Notice: Subject to any disclaimer, the term of this patent is extended or adjusted under 35 U.S.C. 154(b) by 0 days.

(21) Appl. No.: 09/224,736

(22) Filed: Dec. 31, 1998

(51) Int. Cl.$^7$ .......................... B01D 53/22; B01D 71/02
(52) U.S. Cl. .................. 96/11; 95/56; 427/437; 428/607; 428/670
(58) Field of Search ................ 95/56; 96/11; 427/437; 428/606, 607, 670, 671, 673, 674

(56) References Cited

U.S. PATENT DOCUMENTS

| 3,428,476 | * | 2/1969 | Langley et al. | 96/11 X |
|---|---|---|---|---|
| 3,439,474 | * | 4/1969 | McKinley | 95/56 |
| 3,447,288 | * | 6/1969 | Juda et al. | 96/11 |
| 4,589,891 | * | 5/1986 | Iniotakis et al. | 96/11 |
| 4,655,797 | * | 4/1987 | Iniotakis et al. | 96/11 X |
| 5,139,541 | * | 8/1992 | Edlund | 95/56 |
| 5,217,506 | * | 6/1993 | Edlund et al. | 95/56 |
| 5,259,870 | * | 11/1993 | Edlund | 95/56 |
| 5,393,325 | * | 2/1995 | Edlund | 95/56 |
| 5,498,278 | * | 3/1996 | Edlund | 95/56 X |
| 5,738,708 | * | 4/1998 | Peachey et al. | 95/56 |
| 5,904,754 | * | 5/1999 | Juda et al. | 95/56 X |

* cited by examiner

Primary Examiner—Robert H. Spitzer
(74) Attorney, Agent, or Firm—Rines and Rines

(57) ABSTRACT

A novel method of producing an improved thin hydrogen-selective palladium-alloy membrane, through solid-solid interdiffusion of thin films or layers of palladium and a palladium-enhancing metal, such as copper, subjected in the presence of a reducing agent, such as hydrogen, to an elevated temperature below the melting point of both metals, for a sufficient time to effect substantially complete interdiffusion of the metals.

7 Claims, 2 Drawing Sheets

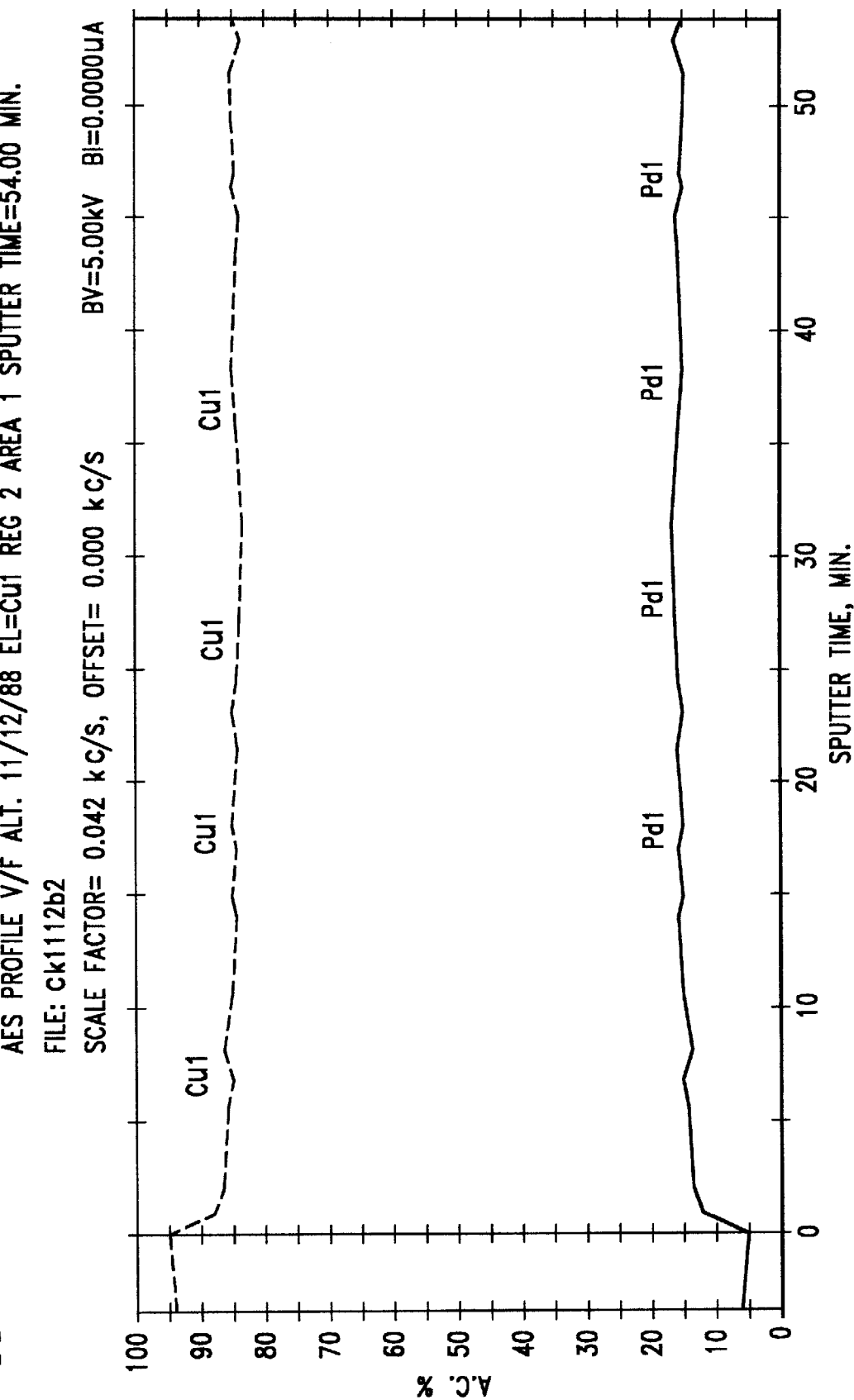

Figure 1:
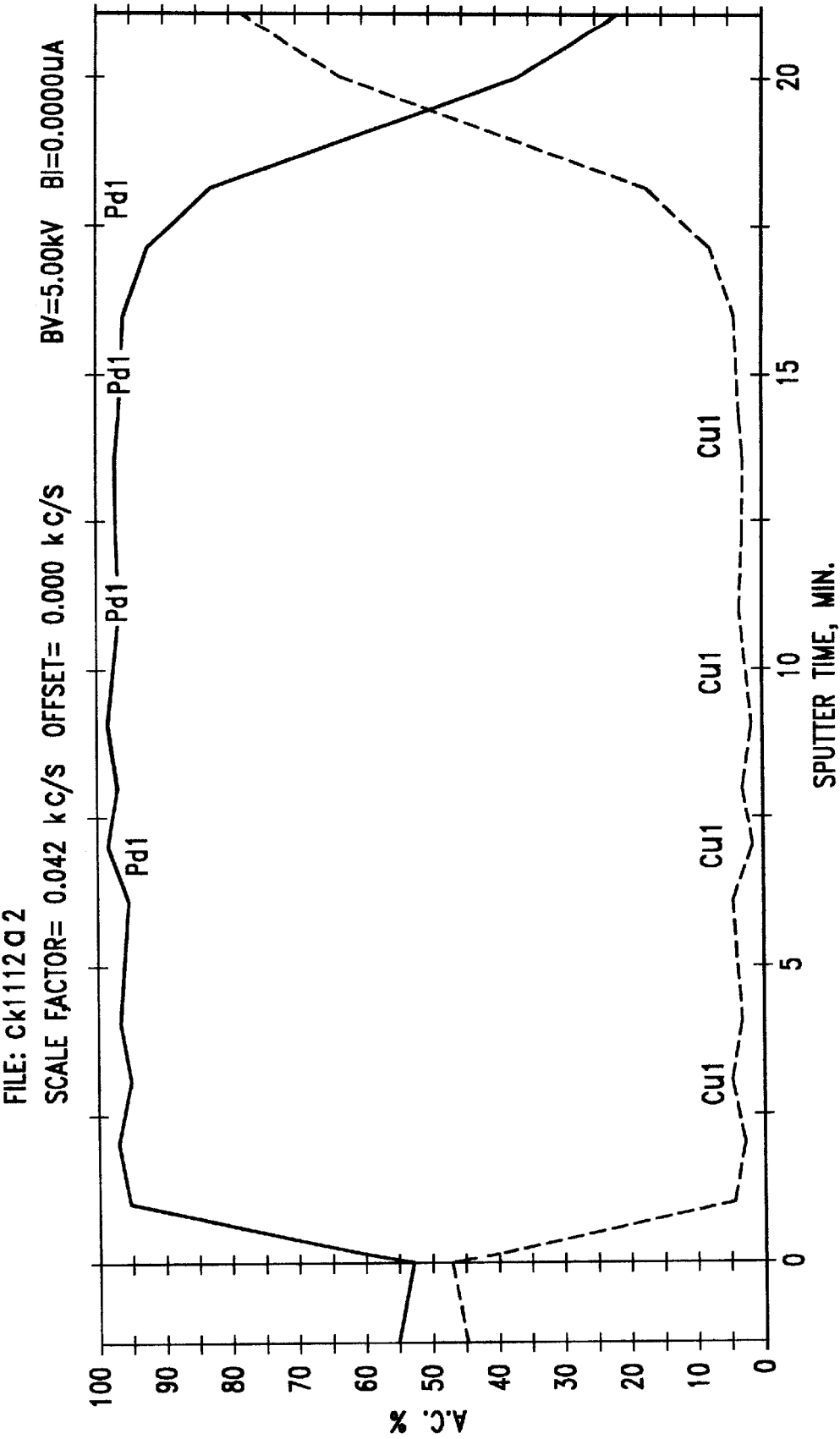

METHOD OF PRODUCING THIN PALLADIUM-COPPER AND THE LIKE, PALLADIUM ALLOY MEMBRANES BY SOLID-SOLID METALLIC INTERDIFFUSION, AND IMPROVED MEMBRANE

BACKGROUND

The present invention relates to thin hydrogen-selective palladium-alloy membranes and the like and to novel methods of preparing the same; being more particularly directed to such alloys produced by novel solid-solid interdiffusion of pressure-contacting films or layers of palladium metal with palladium-enhancing metals, such as copper and silver and the like.

This application is based in part upon the discovery disclosed in our U.S. patent application Ser. No. 880,990, now U.S. Pat. No. 5,904,754 in which an assembly of a palladium/copper (60%:40% by weight) alloy foil is edge-area diffusion-bonded to a copper-surfaced metallic frame. The advantages of such hydrogen-selective Pd/Cu alloy membranes have been cited in this application which is incorporated herein by reference.

Commonly, thin 60% Pd/40% Cu foil membranes are made from billets which are solidified melts of the two metals in uniform admixture. Starting with the billet, thinning involves an elaborate and expensive sequence of steps of rolling and annealing, with the cost increasing disproportionately as the practical low thickness limit of about 0.001 inch of a pinhole-free foil is reached. Similarly, other hydrogen-selective palladium alloy foils are generally made from alloy billets. These include in particular the well known silver/palladium alloy containing 23–25% silver (herein Pd/23–25% Ag). In general, to form a suitable palladium bearing membrane, palladium is alloyed with one (and sometimes more than one) stability- and/or permeability-enhancing metal, as shown, for example, in the publication entitled "Hyperpure Hydrogen From Palladium Alloy Membrane Permeation", by R. Goto, *Chemical Economy and Engineering Review* (Japan), 2(10), pp 44–50 (1970), also included herein by reference.

We have now found that the edge-area intermetallic diffusion-bonding technique of said copending application can be extended to the generation of, preferably, thin palladium/copper and the like selected alloy foils, including the above-referred silver/palladium alloy. The method is especially advantageous in producing less than about 25 micrometer (ca. 0.001") thick membranes. Here the thinner the better for intermetallic diffusion, in contrast to the limitation of excessive costs of thin sheet rolling from billets.

The prior art in this field has been oriented toward determining intermetallic diffusion constants for Pd/Cu and Pd/Ag binary, thin film systems. Intermetallic diffusion of Pd/Ag layers has been discussed in "Interdiffusion studies in silver/palladium couples by means of Auger depth profiling", by Bukaluk and Rozwadowski in Vacuum 46(5/6), pp 579–582 (1995) and in "Interdiffusivities in silver-palladium composition-modulated foils", by Henein and Hilliard in *Journal of Applied Physics* 55(8), pp 2895–2900 (1984). The Pd/Cu system has been likewise investigated in "Diffusion and Size Effect in Thin Films of the Systems Cu-Pd and Cu-Ag", by Grebennik and Zyman in *Fiz. metal metalloved.* (Russian), 32(4), pp 891–893 (1971), and in "Study of interdiffusion in Pd/Cu multilayered films by Auger depth profiling", by Jeon, et. al., *Journal of Applied Physics*, 75(12), pp 7825–7828 (1994). While these studies attempt to understand the fundamentals of the intermetallic diffusion process they do not disclose methods for fabricating thin foils for use as hydrogen separation membranes.

In accordance with the present invention, an improved technique and method of fabricating hydrogen-selective alloy membranes by a novel intermetallic solid-metal interdiffusion process is now provided, producing also improved stability and/or enhanced hydrogen permeability in the resulting alloy membranes.

OBJECTS OF INVENTION

An object of the invention, accordingly, is to provide a new and improved method of producing thin hydrogen-selective palladium-alloy membranes and the like that shall not be subject to the above discussed and other limitations of the prior art; but, to the contrary, through a novel interdiffusion of physically contacting thin palladium and copper or other palladium-enhancing metal films or layers at elevated temperatures in the presence of a reducing agent, provides significant improvements in fabrication facility, cost and performance, particularly for very thin films or layers.

A further object of this invention to produce, by interdiffusion of solid metals, a novel thin hydrogen-selective alloy membrane of palladium with, preferably, copper, or another interdiffusing metal that contributes stability and/or enhanced hydrogen-permeability to the membrane (referred to above as a "Palladium-enhancing metal").

Other and further objects will be explained hereafter and are more particularly delineated in the appended claims.

SUMMARY

In summary, from one of its broader aspects, the invention embraces a method of producing a hydrogen-selective palladium-alloy membrane comprising the steps of physically contacting, as with pressure, a thin solid specimen of palladium metal with a thin solid specimen of a Pd-enhancing metal, preferably copper, and subjecting the same in the presence of a reducing agent, preferably hydrogen gas, to an elevated temperature below the melting point of both metals for a sufficient period of time to effect substantially complete solid-solid interdiffusion of said metals.

Preferred and best mode techniques and membrane compositions are later detailed.

DRAWINGS

The invention will now be explained in connection with the accompanying drawings, FIG. 1 which is an experimentally derived graph illustrating Pd and Cu concentrations for a control (Sample 1) as a function of metal sputtering time (which is a linear function of depth); and FIG. 2 is a similar plot for the alloy produced by the solid-solid interdiffusion technique of the invention (Sample 2).

PREFERRED EMBODIMENTS OF THE INVENTION

For structural reasons, it is advantageous to provide at least one of the two metals in the form of a thin foil, and to plate thereon finely divided particles of the other metal. Thus, a thin copper foil or layer can be coated on each side with substantially equally thick layers of palladium metal, for example by electroless plating; and, similarly, a thin palladium foil can be so coated with copper metal layers, for example by electroplating. Further very thin (typically less than one micrometer in thickness each) solid alternating palladium and copper films, such as are vacuum sputtered on a flat substrate, can readily be alloyed by such metallic interdiffusion.

By way of example demonstrating the metallic interdiffusion of the invention, an 8 micrometer thick copper foil specimen, 3 cm×3 cm, was coated with 0.05 micrometer thick palladium metal on each side by electroless plating at 65° C. for 90 minutes from a solution consisting of 1.9 ml of 8.48% w/w $Pd(NO_3)_2$, 20 ml of 28% $NH_3$, 4 gm of $Na_2EDTA$, and 0.5 ml of 1 M $N_2H_2$ diluted to 100 ml with deionized water, followed by washing the sample with de-ionized water and drying it at room temperature. Three samples, each 1 cm×1 cm, were cut from this Pd-coated specimen. Sample 1 remained untreated and served as the control. Sample 2 was subjected in a flange assembly to hydrogen gas at a pressure of 100 psig for 20 hours at above about 300° C.—specifically 400° C. This elevated temperature is below the melting point of both metals but has been found appropriate if applied for a sufficient period of time (in this case, said 20 hours) to effect substantially complete solid-solid interdiffusion of the metals.

Sample 3 underwent the same treatment with nitrogen replacing the hydrogen In connection with Sample 3, its palladium layer flaked off of the original copper foil, and, hence, no significant interdiffusion was observed. Samples 1 and 2 were analyzed by Auger Electron Spectroscopy (AES) for surface elemental composition combined with Argon ion sputtering for depth profiling to provide a composition versus depth profile (as in the before mentioned articles of Jeon, et. al. and Bukaluk and Rozwadowski). FIG. 1 depicts the analysis of the control, Sample 1 giving the Pd and Cu concentrations as a function of the sputtering time, which is a linear function of the depth. Confirming the existence of the separate Pd coating on the Cu foil, the plot of FIG. 1 shows palladium (with negligible copper) for 15 minutes (the time it takes to penetrate the Pd electroplated Pd layer), and the subsequent switch of palladium disappearing and copper appearing in the next six minutes. FIG. 2 depicts the analysis for Sample 2. Here the sputtering time was extended to 55 minutes, translating to a depth of approximately 0.2 micrometers. Except for a slight superficial layer, this sample is throughout an alloy containing 85% Pd and 15% Cu demonstrating the alloy formation by solid-solid interdiffusion phenomenon of the present invention in the presence of pressurized hydrogen.

By way of example illustrating the hydrogen permeability of a Pd/Cu membrane made by the method of this invention, another specimen of 8 micrometer thick copper foil was coated with Pd by the procedure described above, the difference being that a much thicker layer of palladium was deposited by repeating the plating procedure several times until the specimen was around 60% by weight palladium and 40% copper. This sample was annealed under hydrogen in the same flange apparatus described above for 72 hours at 400° C. in a hydrogen environment. An in situ flux test on pure hydrogen at 20 psig revealed a flux of around 20 $cc(H_2)/cm^2$-min. Under 20 psig helium, no measurable flux was observed, confirming that no leaks or pinholes were responsible for the hydrogen flux, and verifying the formation of a hydrogen permeable alloy foil.

As pointed out above, the technique is also applicable to silver and other interdiffusing, pd-enhancing metals, as well, and further modifications will also occur to those skilled in the art; such being considered to fall within the spirit and scope of the invention as defined in the appended claims.

What is claimed is:

1. The method of producing a thin hydrogen-selective palladium-alloy membrane comprising the steps of physically contacting thin solid specimens consisting of palladium metal with thin solid specimens consisting of an interdiffusing palladium-enhancing metal, and subjecting the same in the presence of reducing agent to an elevated temperature below the melting point of both metals but above about 300° C. for a sufficient period of time to effect substantially complete solid-solid interdiffusion of said metals.

2. The method of claim 1 wherein the physical contacting is effected under pressure.

3. The method of claim 1 wherein the reducing agent is hydrogen and the palladium-enhancing metal specimen is one of copper and silver.

4. The method of claim 3 wherein said copper specimen is a foil less than 10 micrometers thick, said palladium specimen consists of a less than 12 micrometers thick layer of palladium metal deposited on said foil by electroless plating, and wherein said interdiffusion is done at about 400° C. in a hydrogen atmosphere for about 72 hours.

5. The method of claim 1 wherein said palladium-enhancing metal specimen is a less than 20 micrometer thick copper foil bearing on each face a thin coating of substantially the same thickness of said palladium metal specimen.

6. The method of claim 1 wherein said palladium specimen is less than 20 micrometer thick palladium foil bearing on each face a thin coating of copper metal electroplated thereon.

7. A thin hydrogen-selective palladium alloy membrane of palladium and copper formed by the method of claim 3.

* * * * *